US009191706B2

(12) United States Patent
Lim (10) Patent No.: US 9,191,706 B2
(45) Date of Patent: Nov. 17, 2015

(54) DISPLAY APPARATUS AND SCHEDULED VIEWING SETTING METHOD USING THE SAME

(75) Inventor: Jin-tack Lim, Seoul (KR)

(73) Assignee: SAMSUNG ELECTRONIC CO., LTD., Suwon-si (KR)

( * ) Notice: Subject to any disclaimer, the term of this patent is extended or adjusted under 35 U.S.C. 154(b) by 236 days.

(21) Appl. No.: 13/617,577

(22) Filed: Sep. 14, 2012

(65) Prior Publication Data

US 2013/0136422 A1     May 30, 2013

(30) Foreign Application Priority Data

Nov. 29, 2011    (KR) ........................ 10-2011-0126311

(51) Int. Cl.
    *H04N 5/76*      (2006.01)
    *H04N 21/442*      (2011.01)
    *H04N 5/782*      (2006.01)
    *H04N 21/488*      (2011.01)
    *H04N 21/433*      (2011.01)
    *H04N 21/4335*      (2011.01)
    *H04N 5/44*      (2011.01)
    *H04N 21/458*      (2011.01)

(52) U.S. Cl.
     CPC ....... *H04N 21/44218* (2013.01); *H04N 5/4403* (2013.01); *H04N 5/782* (2013.01); *H04N 21/4334* (2013.01); *H04N 21/4335* (2013.01); *H04N 21/4583* (2013.01); *H04N 21/4882* (2013.01)

(58) Field of Classification Search
     CPC ............................................... H04N 21/44218
     USPC .............................................. 386/291, E5.001
     See application file for complete search history.

(56) References Cited

U.S. PATENT DOCUMENTS

| | | | |
|---|---|---|---|
| 2003/0099462 A1* | 5/2003 | Matsugami | ...................... 386/83 |
| 2006/0195867 A1* | 8/2006 | Takehara et al. | ................ 725/46 |
| 2008/0005206 A1* | 1/2008 | Rajakarunanayake | ........ 707/205 |
| 2008/0250457 A1* | 10/2008 | Ohno et al. | ...................... 725/58 |
| 2010/0220972 A1* | 9/2010 | Bryan | .............................. 386/66 |
| 2010/0329645 A1* | 12/2010 | Sakamoto | ..................... 386/297 |
| 2011/0070819 A1 | 3/2011 | Shimy et al. | |
| 2011/0150429 A1* | 6/2011 | Kaneko | ......................... 386/291 |

FOREIGN PATENT DOCUMENTS

| | | |
|---|---|---|
| JP | 10-188533 A | 7/1998 |
| JP | 2011-40937 A | 2/2011 |
| KR | 10-1998-085988 A | 12/1998 |
| KR | 10-0219635 B1 | 9/1999 |
| KR | 10-2006-0029438 A | 4/2006 |
| KR | 10-2007-0110670 A | 11/2007 |
| WO | 2011/008638 A1 | 1/2011 |

OTHER PUBLICATIONS

Communication issued on Jul. 15, 2015 by the European Patent Office in related Application No. 12190147.4.

* cited by examiner

*Primary Examiner* — Hung Dang
*Assistant Examiner* — Girumsew Wendmagegn
(74) *Attorney, Agent, or Firm* — Sughrue Mion, PLLC (57) ABSTRACT

A method of setting a scheduled viewing of broadcast content is provided. The method includes: receiving a command for setting a scheduled viewing of broadcast content; recording the scheduled broadcast content; during the recording, detecting presence of a user; and determining whether to delete the recorded broadcast content based on a result of the detecting the presence of the user.

24 Claims, 10 Drawing Sheets

DISPLAY APPARATUS AND SCHEDULED VIEWING SETTING METHOD USING THE SAME

CROSS-REFERENCE TO RELATED APPLICATION(S)

This application claims priority under 35 U.S.C. §119 from Korean Patent Application No. 10-2011-0012631, filed on Nov. 29, 2011, in the Korean Intellectual Property Office, the disclosure of which is incorporated herein by reference in its entirety.

BACKGROUND

1. Field

The present general inventive concept generally relates to a display apparatus and a scheduled viewing setting method using the same, and more particularly, to a display apparatus capable of receiving broadcast content and outputting the received broadcast content and a scheduled viewing setting method using the display apparatus.

2. Description of the Related Art

Due to recent developments in electronic technology, users nowadays can hardly miss desired broadcast content with the aid of a scheduled viewing function.

The scheduled viewing function is characterized by scheduling a desired broadcast program to be viewed and automatically switching to a channel corresponding to the desired broadcast program at a scheduled broadcast time so that a user can view the desired broadcast program with convenience.

However, a related-art scheduled viewing function simply involves automatically switching to a channel scheduled to be viewed, and thus may not be effective especially when a user is not present or in a situation where it is not possible to view broadcast content.

Therefore, there is a need for methods to effectively provide broadcast content even when a user is not present or in a situation where it is not possible to view the broadcast content at a scheduled broadcast time.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a display apparatus capable of recording broadcast content for which a scheduled viewing function is set and deleting the recorded broadcast content in accordance with the availability of a viewer and a scheduled viewing setting method using the display apparatus.

According to an aspect of the exemplary embodiments, there is provided a method of setting a scheduled viewing of broadcast content, the method including: receiving a user command for setting a scheduled viewing of broadcast content; recording the scheduled broadcast content; during the recording, detecting presence of a user; and determining whether to delete the recorded broadcast content based on a result of the detecting the presence of the user.

The detecting may include detecting the presence of the user at regular intervals of time during the recording to determine whether there is a case where the user has not been present for more than a predefined amount of time.

The determining whether to delete the recorded broadcast content may include, if it is determined that there is no case where the user has not been present for more than the predefined amount of time, deleting the recorded broadcast content.

The determining whether to delete the recorded broadcast content may include, if it is determined that the user has not been present for more than the predefined amount of time: displaying a Graphic User Interface (GUI) asking whether to delete the recorded broadcast content; and in response to a receipt of a delete command to delete the recorded broadcast content from the user via the GUI, deleting the recorded broadcast content.

The determining whether to delete the recorded broadcast content may include, if the user is determined to have not been present for more than the predefined amount of time, detecting the presence of the user again at an end of broadcasting of the scheduled broadcast content.

The determining whether to delete the recorded broadcast content may also include: if the user is determined to be present at the end of the broadcasting of the scheduled broadcast content, displaying a GUI asking whether to delete the recorded broadcast content; and in response to a receipt of a delete command to delete the recorded broadcast content from the user via the GUI, deleting the recorded broadcast content.

The method may also include, if the user is determined to be still not present at the end of the broadcasting of the scheduled broadcast content, displaying a GUI indicating that the recording of the broadcast content is complete.

The method may also include, if the user is determined to be present at the end of the broadcasting of the scheduled broadcast content after not being present for more than the predefined amount of time, displaying a GUI asking whether to render the recorded broadcast content.

The method may also include: during the recording, receiving a "record" command for the scheduled broadcast content; and upon receiving the "record" command, stopping the recording, deleting the recorded broadcast content, and re-recording the scheduled broadcast content from a point where the recording has stopped.

The method may also include: if there are two or more scheduled broadcast contents whose broadcast times overlap with each other, displaying a GUI indicating that a scheduled viewing of at least one of the two or more scheduled broadcast contents is unavailable.

The recording the scheduled broadcast content may include, if the scheduled broadcast content cannot be recorded, recording a rerun of the scheduled broadcast content.

According to another aspect of the exemplary embodiments, there is provided a display apparatus for setting a scheduled viewing of broadcast content, the display apparatus including: a display unit; an input unit which receives a user command for setting a scheduled viewing of broadcast content; a control unit which records the scheduled broadcast content; and a sensing unit which detects presence of a user during the recording of the scheduled broadcast content, wherein the control unit determines whether to delete the recorded broadcast content based on a result of the detection performed by the sensing unit.

The control unit may control the sensing unit to detect the presence of the user at regular intervals of time during the recording of the scheduled broadcast content to determine whether the user has not been present for more than a predefined amount of time.

The control unit may delete the recorded broadcast content if the result of the detection performed by the sensing unit indicates that there is no case where the user has not been present for more than the predefined amount of time.

If the result of the detection performed by the sensing unit indicates that there is no case where the user has not been present for more than the predefined amount of time, the control unit may display a GUI asking whether to delete the recorded broadcast content on the display unit, and in response to a receipt of a delete command to delete the recorded broadcast content from the user via the GUI, may delete the recorded broadcast content.

If the result of the detection performed by the sensing unit indicates that there is no case where the user has not been present for more than the predefined amount of time, the control unit may control the sensing unit to redetect the presence of the user again at an end of broadcasting of the scheduled broadcast content.

If a result of the redetection performed by the sensing unit indicates that the user is present at the end of the broadcasting of the scheduled broadcast content, the control unit may display a GUI asking whether to delete the recorded broadcast content on the display unit, and in response to a receipt of a command to delete the recorded broadcast content from the user via the GUI, may delete the recorded broadcast content.

If a result of the redetection performed by the sensing unit indicates that the user is still not present at the end of the broadcasting of the scheduled broadcast content, the control unit may display a GUI indicating that the recording of the scheduled broadcast content is complete on the display unit.

If the result of the redetection performed by the sensing unit indicates that the user is present at the end of the broadcasting of the scheduled broadcast content after not being present for more than the predefined amount of time, the control unit may display a GUI asking whether to render the recorded broadcast content on the display unit.

If a "record" command for the scheduled broadcast content is received during the recording of the scheduled broadcast content, the control unit may stop the recording of the scheduled broadcast content, deletes the recorded broadcast content, and may re-record the scheduled broadcast content from a point where the recording has stopped in accordance with the "record" command.

If there are two or more scheduled broadcast content items whose broadcast times collide with each other, the control unit may display a GUI indicating that a scheduled viewing of at least one of the two or more scheduled broadcast content items is unavailable on the display unit.

If the scheduled broadcast content cannot be recorded, the control unit may record a rerun of the scheduled broadcast content.

According to the above aspects of the exemplary embodiments, it is possible to record scheduled broadcast content and decide whether to delete the recorded scheduled broadcast content in accordance with the presence of a user. Therefore, it is possible to improve user satisfaction by providing the recorded scheduled broadcast content to the user when the user is not present to view the corresponding broadcast content at a scheduled viewing time.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 1:
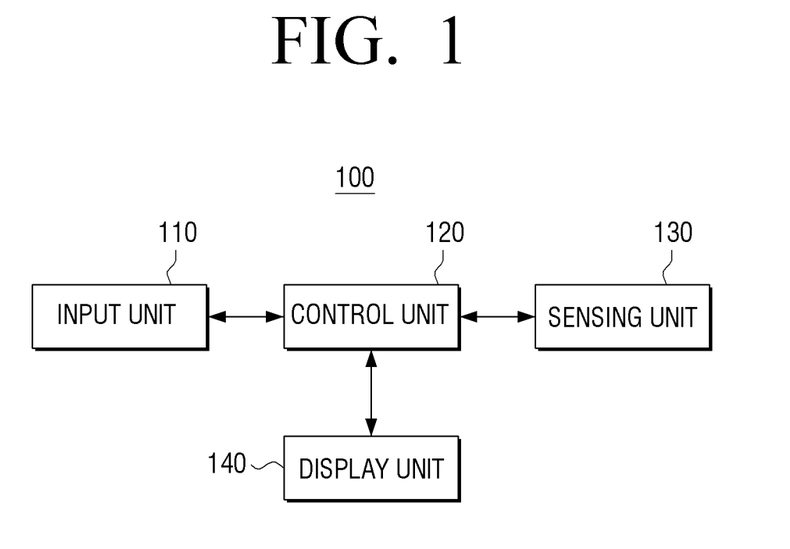
FIG. 1 is a block diagram illustrating a display apparatus according to an exemplary embodiment.

FIG. 1 is a block diagram illustrating a display apparatus according to an exemplary embodiment. Referring to FIG. 1, a display apparatus 100 may be, but is not limited to, a television (TV), a set-top box, a digital versatile disc (DVD) player, a mobile terminal, a desktop computer, a laptop computer, etc. That is, the display apparatus 100 may be any type of electronic device capable of receiving and outputting a broadcast signal.

The display apparatus 100 includes an input unit 110, a control unit 120, a sensing unit 130, and a display unit 140.

The input unit 110 may receive a user command for setting a scheduled viewing of broadcast content.

The term "scheduled viewing" may indicate, but is not limited to, a function of automatically switching to a channel scheduled to be viewed upon the arrival of a predetermined scheduled viewing time so that a user can watch broadcast content from the channel at the predetermined scheduled viewing time.

The user may set a scheduled viewing of broadcast content in various manners.

For example, the user may set a scheduled viewing of broadcast content by entering the beginning time and end time of the broadcast content and a channel number corresponding to the broadcast content. Alternatively, the user may set a scheduled viewing function on an Electronic Program Guide (EPG) on a broadcast content-by-broadcast content basis. That is, the user may select a specific broadcast content to be viewed, and the system will automatically schedule a viewing of the specific broadcast content according to time and channel based on schedule information received for that specific broadcast content.

The input unit 110 may be implemented as a touch screen, a touchpad, a key button, a keypad, etc. The input unit 110 may also be configured to receive a user command from a remote control (not illustrated). The input unit 110 may receive not only a user command for setting a scheduled viewing but also various other user commands for controlling the display apparatus 100 such as, for example, a channel selection command, a volume control command, a "record" command, etc.

The control unit 120 may control the general operations of the input unit 110, the sensing unit 130, and the display unit 140.

The control unit 120 may record scheduled viewing-set broadcast content, which is broadcast content for which a scheduled viewing is set. For example, when the broadcasting of scheduled viewing-set broadcast content begins, the control unit 120 may begin to record the scheduled viewing-set broadcast content in an internal storage medium (not illustrated) in the display apparatus 100 or an external storage medium connected to the display apparatus 100.

In this example, the control unit 120 may output a Graphic User Interface (GUI) asking whether to record the scheduled viewing-set broadcast content to the display unit 140 at the beginning of the broadcasting of the scheduled viewing-set broadcast content. In response to the receipt of a "record" command from the user, the control unit 120 may record the scheduled viewing-set broadcast content.

During the recording of scheduled viewing-set broadcast content, the sensing unit 130 may determine whether the user is present to view the scheduled viewing-set broadcast content. For example, the sensing unit 130 may detect whether there is a case in which a user is not present for a predetermined time period at regular intervals of time during a time period between the beginning time and the end time of the scheduled viewing-set broadcast content and may thus determine whether the user has not been present for more than a predefined amount of time. The frequency of the detection of whether the user is present or not and the predefined amount of time for determining the presence of the user may be set by the user.

The sensing unit 130 may include at least one of a thermal sensor and a motion sensor. Thus, the sensing unit 130 may determine if the user is present or not by detecting the external, physical presence of the user's body nearby or in a set proximity of the sensing unit 130. In addition, the sensing unit 130 may comprise a camera (not shown) and so on which is provided on the front side of the display apparatus 100. Accordingly, the sensing unit 130 may capture the front side of the display apparatus 100 while recording is performed so as to determine whether there is a user who is viewing broadcast contents.

The display unit 140 may output scheduled viewing-set broadcast content, under the control of the control unit 120, upon the beginning of the broadcasting of the scheduled viewing-set broadcast content.

The display unit 140 may also output a GUI asking whether to record scheduled viewing-set broadcast content, a GUI asking whether to delete recorded scheduled viewing-set broadcast content, a GUI indicating whether the recording of scheduled viewing-set broadcast content is complete, a GUI asking whether to view the recorded broadcast content, and a GUI indicating whether a scheduled viewing of scheduled viewing-set broadcast content is unavailable.

The display unit 140 may include a display panel (not illustrated) and a panel driver (not illustrated). The display panel may be implemented as a liquid crystal display (LCD), an organic light-emitting diode (OLED) display, or a plasma display panel (PDP).

The control unit 120 may determine whether to delete recorded scheduled viewing-set broadcast content based on the result of the determination of the presence of the user during the recording of scheduled viewing-set broadcast content.

For example, if the user is determined to be not present for more than a predetermined amount of time during the recording of scheduled viewing-set broadcast content, the control unit 120 may delete the recorded scheduled viewing-set broadcast content. More specifically, if the user is determined to be not present for more than the predetermined amount of time, the control unit 120 may output a GUI asking whether to delete the recorded scheduled viewing-set broadcast content on the display unit 140, and may delete the recorded scheduled viewing-set broadcast content in response to the receipt of a "delete" command from the user.

Alternatively, if the user is determined to be not present for more than the predetermined amount of time a first time, the control unit 120 may control the sensing unit 130 to determine the presence of the user again a second time at the end of the broadcasting of the scheduled viewing-set broadcast content to decide whether to delete the recorded scheduled viewing-set broadcast content.

That is, if the user is determined to be not present at the end of the broadcasting of the scheduled viewing-set broadcast content, the control unit 120 may output a GUI asking whether to delete the recorded scheduled viewing-set broadcast content on the display unit 140, and may delete the recorded scheduled viewing-set broadcast content in response to the receipt of a "delete" command from the user.

If the user is determined to be not present at the end of the broadcasting of the scheduled viewing-set broadcast content, the control unit 120 may output a GUI indicating the completion of the broadcasting of the scheduled viewing-set broadcast content on the display unit 140. The GUI indicating the completion of the broadcasting of the scheduled viewing-set broadcast content may continue to be displayed until recognized by the user. Accordingly, even if a user is not present during or after the broadcasting of the scheduled viewing-set broadcast content, the user may be properly notified afterwards that the scheduled viewing-set broadcast content has been recorded for a later viewing and may thus be able to choose to view the scheduled viewing-set broadcast content later.

If the user is determined to be not present during the recording of scheduled viewing-set broadcast content and to be present at the end of the broadcasting of the scheduled viewing-set broadcast content, the control unit 120 may display a GUI asking whether to view the recorded scheduled viewing-set broadcast content on the display unit 140.

In this example, the recorded scheduled viewing-set broadcast content may be available in the internal storage medium or the external storage medium, and the control unit 120 may provide the recorded scheduled viewing-set broadcast content to the user by using a time-shift function.

In a case in which a "record" command is received during the recording of scheduled viewing-set broadcast content, the control unit 120 may stop the recording the scheduled viewing-set broadcast content, may delete the recorded scheduled viewing-set broadcast content, and may re-record the scheduled viewing-set broadcast content from a point where the recording of the scheduled viewing-set broadcast content has stopped in response to the "record" command.

That is, if the user enters a "record" command for the scheduled viewing-set broadcast content while watching the scheduled viewing-set broadcast content, the control unit 120 may stop recording the scheduled viewing-set broadcast content, may delete the recorded scheduled viewing-set broadcast content, and may re-record the scheduled viewing-set broadcast content from a point where the recording of the scheduled viewing-set broadcast content has stopped in response to the "record" command.

In this example, the control unit 120 may output a GUI asking whether to delete the recorded broadcast content on the display unit 140, and may decide whether to delete or preserve the recorded broadcast content in accordance with a selection made from the GUI by the user.

If the broadcast times of at least two scheduled viewing-set broadcast content items overlap with each other, the control unit 120 may output a GUI indicating that a scheduled viewing of at least one of the scheduled viewing-set broadcast content items is unavailable on the display unit 140.

Some broadcast content such as sports broadcast content may be extended beyond their scheduled end times. Thus, if the user sets a scheduled viewing on an EPG on a broadcast content-by-broadcast content basis and predetermined scheduled viewing-set broadcast content is extended beyond its scheduled end time, the scheduled viewing of the predetermined scheduled viewing-set broadcast content may collide with the scheduled viewing of another scheduled viewing-set broadcast content.

For example, in a case in which the user sets a scheduled viewing of "2011-2012 MLB" on channel 11 and a scheduled viewing of "Shrek" on channel 9 and "2011-2012 MLB" is extended beyond its scheduled end time to the extent that the broadcasting of "2011-2012 MLB" overlaps with the broadcasting of "Shrek," the control unit 120 may output a GUI indicating that the scheduled viewing of "Shrek" is unavailable due to the collision with the scheduled viewing of "2011-2012 MLB" on the display unit 140. Alternatively, the control unit 120 may control a communication interface unit (not illustrated) included in the display apparatus 100 to transmit a message indicating the unavailability of the scheduled viewing of "Shrek" to a mobile terminal device of the user.

In a case in which scheduled viewing-set broadcast content cannot be recorded because of, for example, a shortage of storage space in the internal storage medium or the external storage medium, the control unit 120 may output the scheduled viewing-set broadcast content on the display unit 140 upon the beginning of the broadcasting of the scheduled viewing-set broadcast content without recording the scheduled viewing-set broadcast content, and may output a GUI indicating that the scheduled viewing-set broadcast content cannot be recorded on the display unit 140.

In this case, the control unit 120 may record a rerun of the scheduled viewing-set broadcast content with reference to EPG information.

Figure 2:
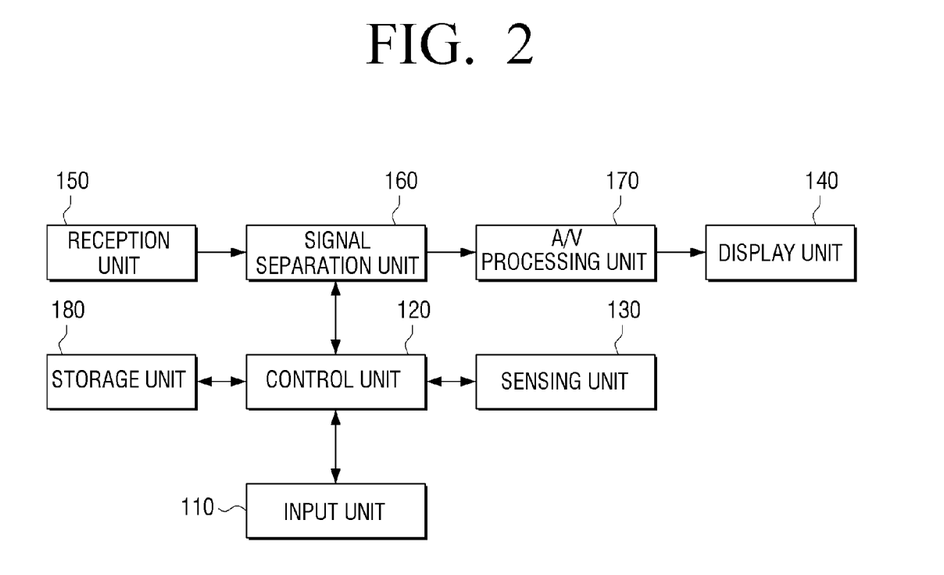
FIG. 2 is a detailed block diagram illustrating a display apparatus according to an exemplary embodiment.

FIG. 2 is a block diagram illustrating a display apparatus according to an exemplary embodiment. Referring to FIG. 2, a display apparatus 100 includes an input unit 110, a control unit 120, a sensing unit 130, a display unit 140, a reception unit 150, a signal separation unit 160, an Audio/Video (A/V) processing unit 170, and a storage unit 180. The input unit 110, the control unit 120, the sensing unit 130, and the display unit 140 are the same as their respective counterparts illustrated in FIG. 1, and thus, detailed descriptions thereof are omitted.

The reception unit 150 may receive broadcast signals from a plurality of channels.

The reception unit 150 may receive a broadcast signal from, for example, a broadcasting station, a satellite, or an external input device, either wirelessly or by wired means, and may demodulate the received broadcast signal. A broadcast signal may include broadcast content received from, for example, a broadcasting station, a satellite, or an external input device, via each channel.

For example, the reception unit 150 may be a tuner for receiving a broadcast signal or an A/V interface for receiving an image from an external input device. The reception unit 150 may include a plurality of tuners and may receive broadcast signals from a plurality of channels at the same time with the aid of the tuners.

The signal separation unit 160 may separate a broadcast signal into a video signal, an audio signal, and broadcast information. The broadcast information may include an EPG for each channel, and the EPG may include the title, the channel title, the broadcast time, and general information of each broadcast content.

The A/V processing unit 170 may process a video signal and an audio signal provided by the signal separation unit 160, by performing signal processing such as, for example, video decoding, video scaling, and audio decoding, such that the video signal and the audio signal can be output by the display unit 140 and an audio output unit (not illustrated), respectively.

The storage unit 180 may be a storage medium in which various programs for operating the display apparatus 100 are stored. For example, the storage unit 180 may be implemented as a memory or a hard disk drive (HDD). When the recording of scheduled viewing-set broadcast content begins, the scheduled viewing-set broadcast content may begin to be stored in the storage unit 180, and the storing of the scheduled viewing-set broadcast content may continue until the broadcasting of the scheduled viewing-set broadcast content ends.

Figure 3:
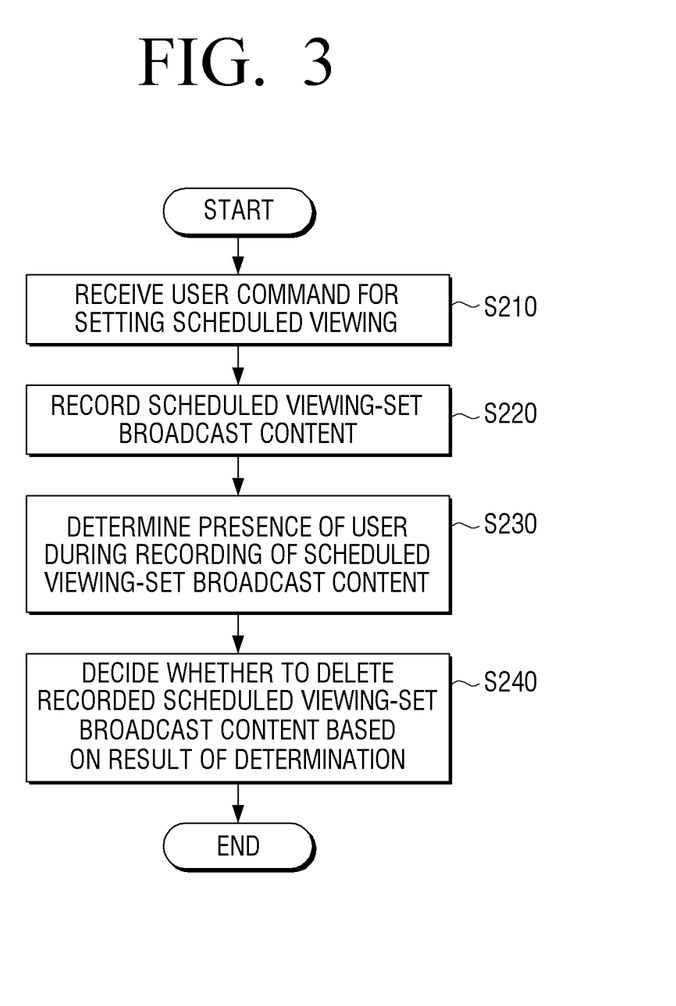
FIG. 3 is a flowchart illustrating a method of setting a scheduled viewing of broadcast content according to an exemplary embodiment.

FIG. 3 is a flowchart illustrating a method of setting a scheduled viewing of broadcast content according to an exemplary embodiment. Referring to FIG. 3, in operation S210, a user command for setting a scheduled viewing of predetermined broadcast content may be received. For example, the beginning and end times of the broadcasting of the predetermined broadcast content, and a channel number corresponding to the predetermined broadcast content may be entered as the user command. Alternatively, a scheduled viewing may be set on an EPG on a broadcast content-by-broadcast content basis.

In operation S220, the scheduled viewing-set broadcast content may be recorded. The recording of the scheduled viewing-set broadcast content may begin at the beginning of the broadcasting of the scheduled viewing-set broadcast content so that the scheduled viewing-set broadcast content may be stored in a storage medium.

In operation S230, during the recording of the scheduled viewing-set broadcast content, whether a user is present or not may be detected. For example, whether the user is present or not may be detected at regular intervals of time during the recording of the scheduled viewing-set broadcast content.

That is, whether the user is present or not may be detected at regular intervals of time during a time period from the beginning to the end of the broadcasting of the scheduled viewing-set broadcast content, and a determination may be made as to whether the user has not been present for more than a predefined amount of time. In operation S230, at least one of a thermal sensor and a motion sensor may be used to detect the presence of the user.

In operation S240, a determination may be made as to whether to delete the recorded scheduled viewing-set broadcast content in accordance with the result of the detection of the presence of the user.

For example, if it is determined that there is no case where the user has not been present for more than the predefined amount of time during the recording of the scheduled viewing-set broadcast content, the recorded scheduled viewing-set broadcast content may be deleted. Alternatively, if it is determined that the user has not been present for more than the predefined amount of time during the recording of the scheduled viewing-set broadcast content, the presence of the user may be detected again at the end of the broadcasting of the scheduled viewing-set broadcast content, and a determination may be made as to whether to delete the recorded scheduled viewing-set broadcast content based on the result of the re-detection of the presence of the user.

Figure 4:
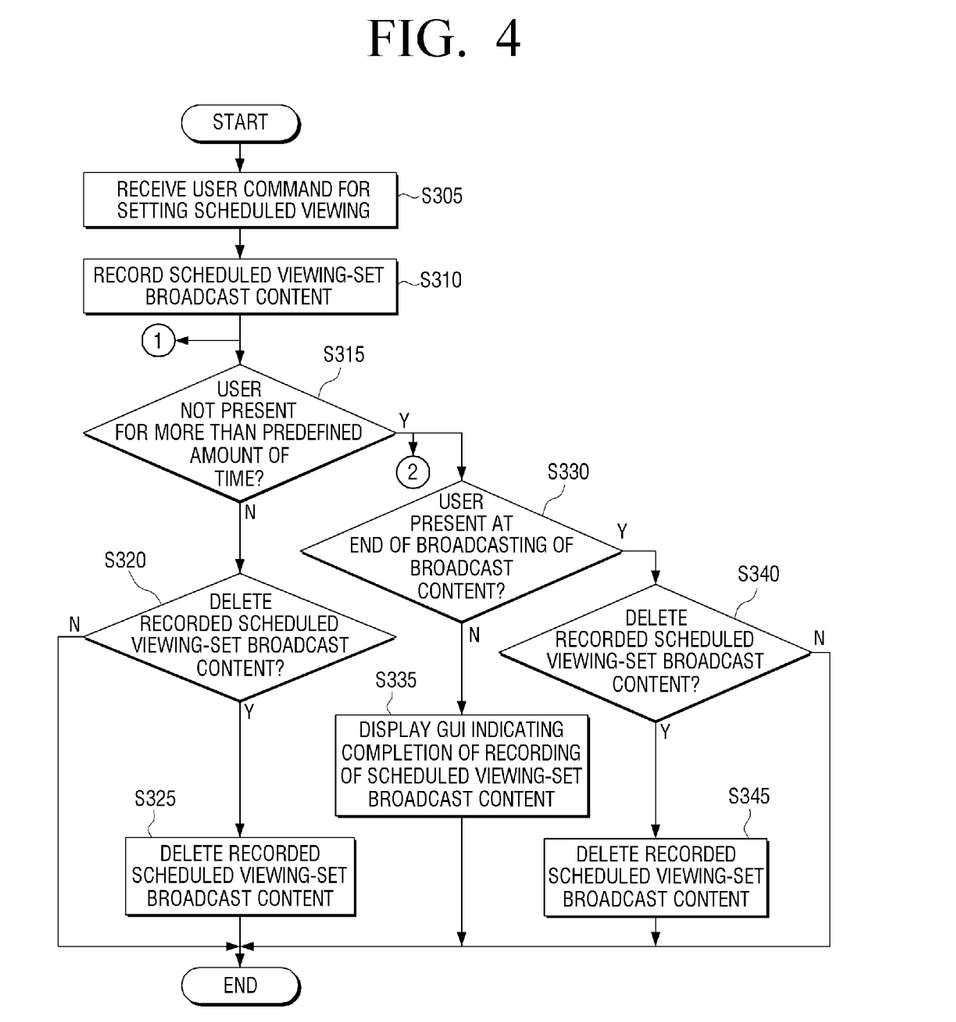
FIGS. 4 to 6 are flowcharts illustrating a method of setting a scheduled viewing of broadcast content according to an exemplary embodiment.

FIG. 4 is a flowchart illustrating a method of setting a scheduled viewing of broadcast content according to an exemplary embodiment. Referring to FIG. 4, in operation S305, a user command for setting a scheduled viewing of predetermined broadcast content may be received.

In operation S310, in response to the beginning of the broadcasting of the scheduled viewing-set broadcast content, the recording of the scheduled viewing-set broadcast content may begin. The scheduled viewing-set broadcast content may be output while being recorded.

In operation S315, during the recording of the scheduled viewing-set broadcast content, the presence of a user may be detected. For example, the presence of the user may be detected at regular intervals of time during the recording of the scheduled viewing-set broadcast content to determine whether the user has not been present for more than a predefined amount of time.

In operation S315-N, if there is no case where the user has not been present for more than the predefined amount of time during the recording of the scheduled viewing-set broadcast content, in operation S325, the recorded scheduled viewing-set broadcast content may be deleted. For example, a GUI asking whether to delete the recorded scheduled viewing-set broadcast content may be displayed in operation S320, and the recorded scheduled viewing-set broadcast content may be deleted in operation S325 only in response to the receipt of a command to delete the recorded scheduled viewing-set broadcast content from the user via the GUI.

In operation S315-Y, if the user is determined to be not present for more than the predetermined amount of time during the recording of the scheduled viewing-set broadcast content, in operation S330, the presence of the user may be detected again at the end of the broadcasting of the scheduled viewing-set broadcast content.

In operation S330-N, if the user is determined to be still not present at the end of the broadcasting of the scheduled viewing-set broadcast content, in operation S335, a GUI indicating that the recording of the scheduled viewing-set broadcast content is complete may be displayed.

Alternatively, in operation S330-Y, if the user is determined to be present at the end of the broadcasting of the scheduled viewing-set broadcast content, in operation S340, a GUI asking whether to delete the recorded scheduled viewing-set broadcast content may be displayed.

In operation S340-Y, if a command to delete the recorded scheduled viewing-set broadcast content is received via the GUI displayed in operation S340, in operation S345, the recorded scheduled viewing-set broadcast content may be deleted. Alternatively, in operation S340-N, if the user wishes not to delete the recorded scheduled viewing-set broadcast content, the recorded scheduled viewing-set broadcast content may not be deleted, but may continue to be stored.

Before the recording of the scheduled viewing-set broadcast content, a GUI asking whether to record the scheduled viewing-set broadcast content may be displayed.

If a "record" command is received for the scheduled viewing-set broadcast content during the recording of the scheduled viewing-set broadcast content, the recording of the scheduled viewing-set broadcast content may be stopped, and the scheduled viewing-set broadcast content may be re-recorded from a point where the recording of the scheduled viewing-set broadcast content has stopped.

Figure 5:
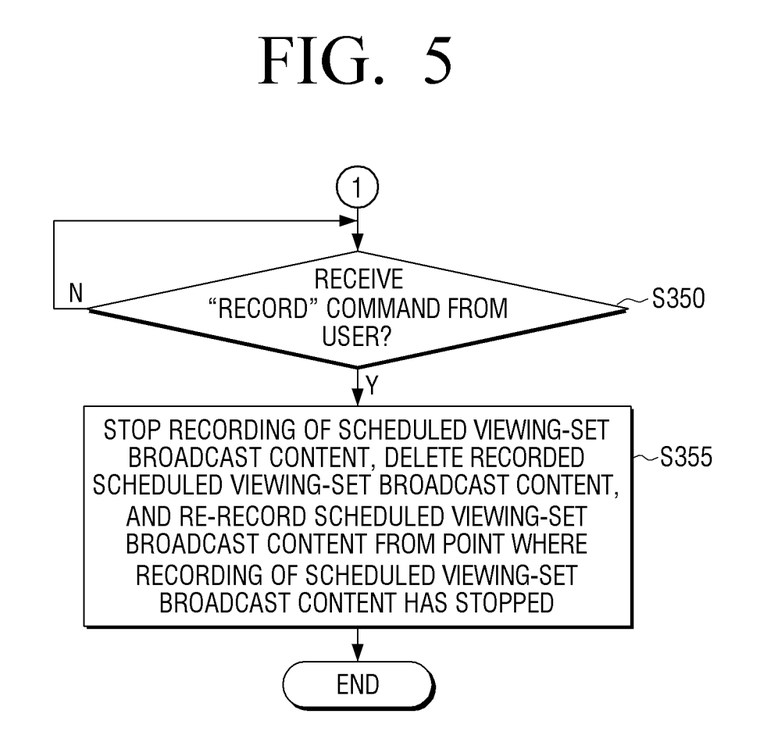

More specifically, referring to FIG. 5, in operation S350, after the beginning of the recording of the scheduled viewing-set broadcast content, a "record" command for the scheduled viewing-set broadcast content may be received. In operation S350-Y, if a "record" command for the scheduled viewing-set broadcast content is received, in operation S355, the recording of the scheduled viewing-set broadcast content may be stopped, the recorded viewing-set broadcast content may be deleted, and the scheduled viewing-set broadcast content may be re-recorded from a point where the recording of the scheduled viewing-set broadcast content has stopped.

If the user is determined to be present at the end of the broadcasting of the scheduled viewing-set broadcast content after not being present for more than the predefined amount of time during the recording of the scheduled viewing-set broadcast content, the user may be advised to view the scheduled viewing-set broadcast content from the beginning of the scheduled viewing-set broadcast content.

Figure 6:
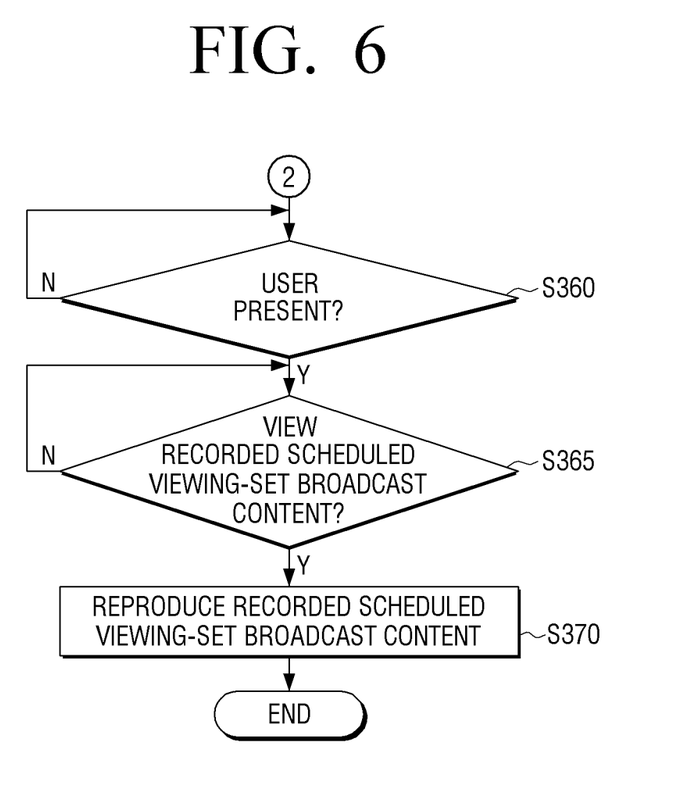

More specifically, referring to FIG. 6, in operation S360-Y, if the user is determined to be present at the end of the broadcasting of the scheduled viewing-set broadcast content after not being present for more than the predefined amount of time during the recording of the scheduled viewing-set broadcast content, in operation S365, a GUI asking whether to view the recorded scheduled viewing-set broadcast content may be displayed.

In operation S370, in response to the receipt of a command to view the recorded scheduled viewing-set broadcast content from the user, the recorded scheduled viewing-set broadcast content may be reproduced from the beginning thereof by using a time-shift function.

In a case in which there are two or more broadcast content items whose broadcast times collide with each other, a GUI indicating that a scheduled viewing of at least one of the broadcast content items is unavailable may be displayed, or a message indicating that a scheduled viewing of at least one of the broadcast content items is unavailable may be transmitted to a mobile terminal device of the user.

In a case in which the scheduled viewing-set broadcast content cannot be recorded, a rerun of the scheduled viewing-set broadcast content may be recorded so that the user may be advised to view the scheduled viewing-set broadcast content later.

FIGS. 7 to 10 are diagrams illustrating GUIs that may be displayed in connection with scheduled viewing-set broadcast content, according to an exemplary embodiment. Referring to FIGS. 7 to 10, assume that a scheduled viewing of "Shrek," which is broadcast on channel 11, is set, and that, upon the beginning of the broadcasting of "Shrek," "Shrek" is recorded while being displayed on a display unit 410.

If a user is determined to be not present for more than a predetermined amount of time during the recording of "Shrek," a GUI asking whether to delete recorded "Shrek" may be output. For example, referring to FIG. 7, a GUI 420 including a message "Do you wish to delete scheduled viewing-set "Shrek"?" may be displayed on the display unit 410.

Figure 7:
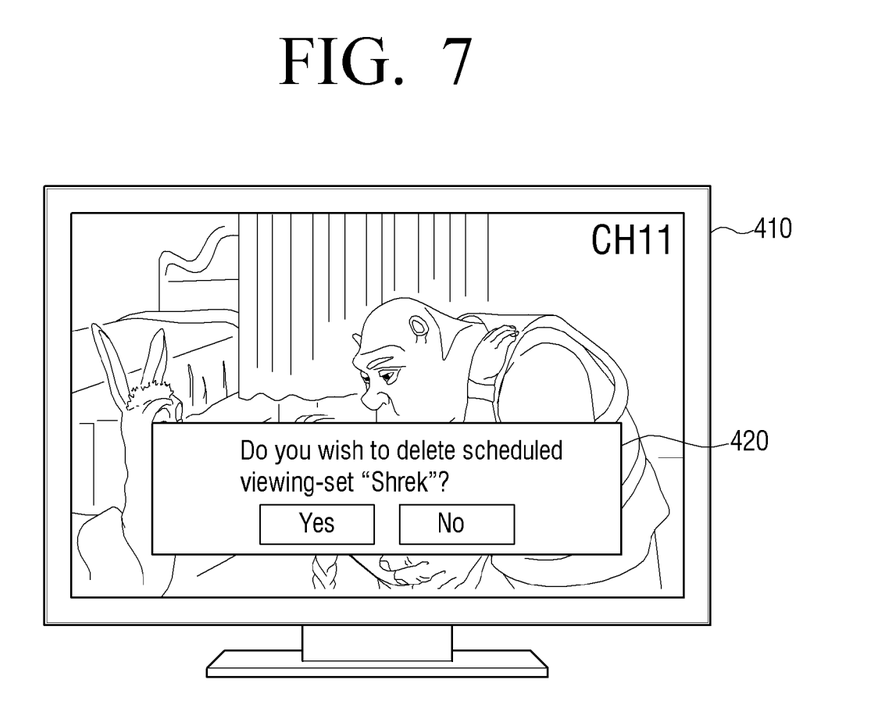
FIGS. 7 to 10 are diagrams illustrating Graphic User Interfaces (GUIs) that may be displayed in connection with scheduled viewing-set broadcast content, according to an exemplary embodiment.
Figure 8:
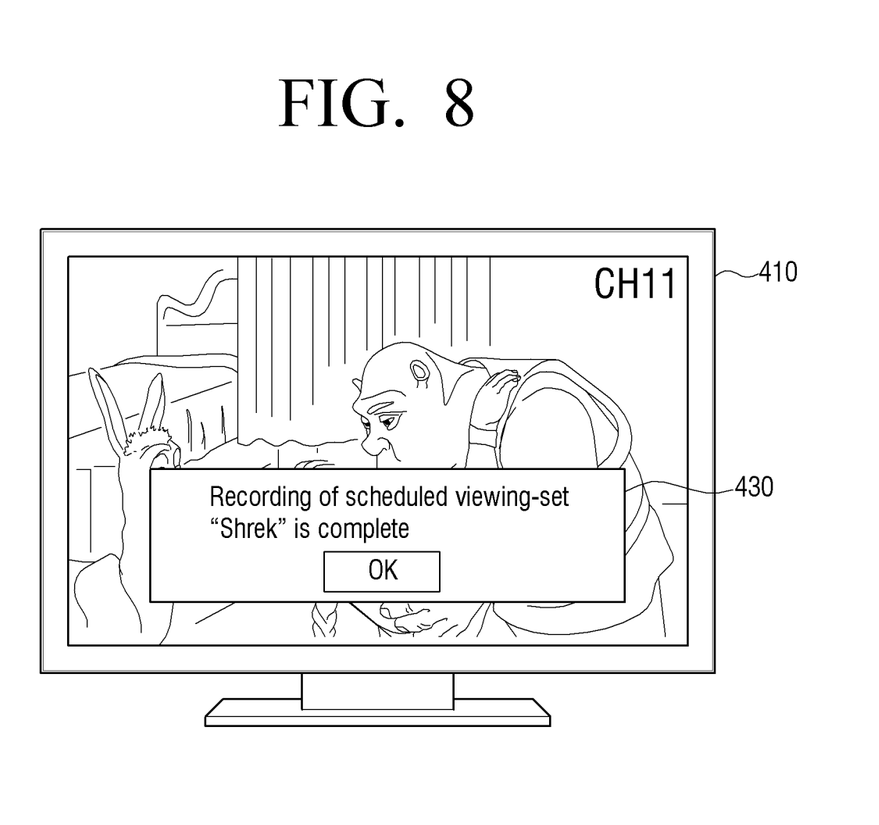

If the user is determined to be present at the end of the broadcasting of "Shrek" after not being present for more than the predetermined amount of time during the recording of "Shrek," the GUI asking whether to delete recorded "Shrek" may also be output.

If the user is determined to be still not present at the end of the broadcasting of "Shrek," a GUI indicating that the recording of "Shrek" is complete may be output. For example, referring to FIG. 8, a GUI 430 including a message "Recording of scheduled viewing-set "Shrek" is complete" may be displayed on the display unit 410.

Figure 9:
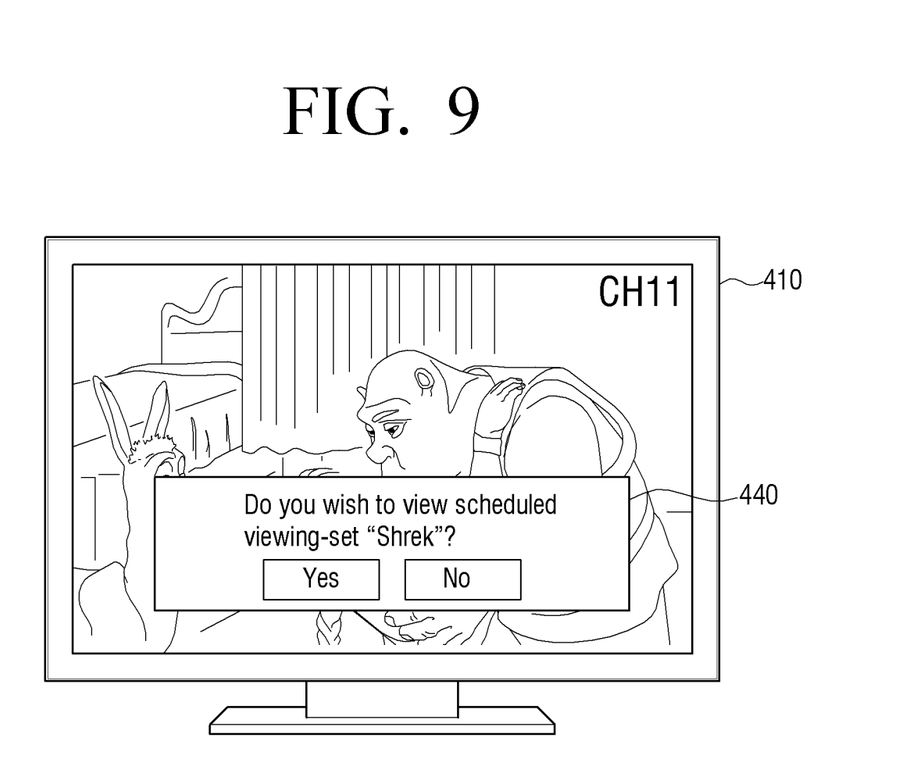
Figure 10:
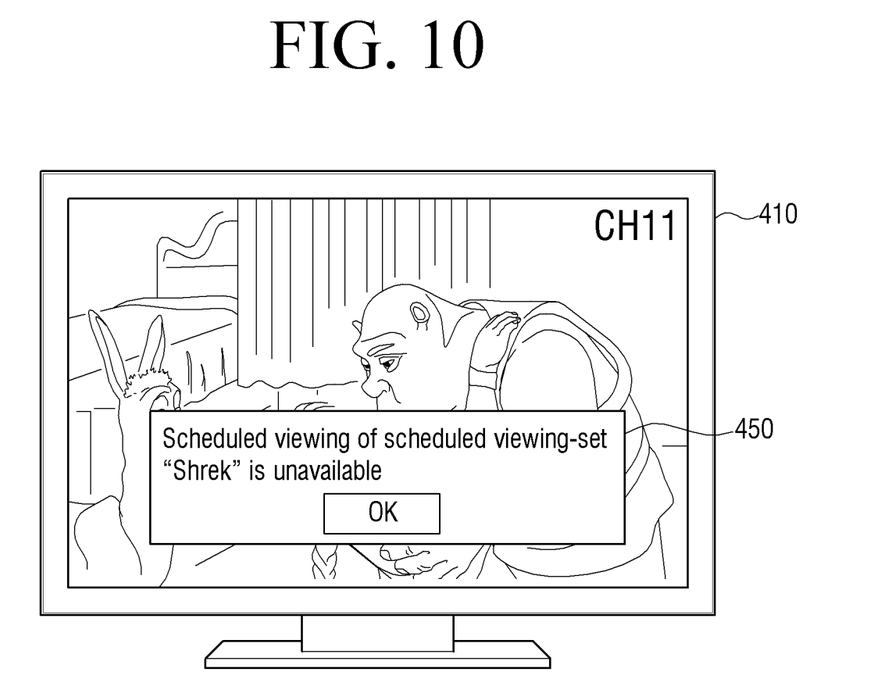

If the user is determined to be present at the end of the broadcasting of "Shrek" after not being present for more than the predetermined amount of time during the recording of "Shrek," a GUI asking whether to view recorded "Shrek" may be output. For example, a GUI 440 including a message "Do you want to view scheduled viewing-set "Shrek"?" may be displayed on the display unit 410.

If there are two or more scheduled viewing-set broadcast content items whose broadcast times collide with each other, a GUI indicating that a scheduled viewing of at least one of the scheduled viewing-set broadcast content items is unavailable may be output. For example, referring to FIG. 10, a GUI 450 including a message "Scheduled viewing of scheduled viewing-set "Shrek" is unavailable" may be displayed on the display unit 410.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of setting a scheduled viewing of broadcast content, the method comprising:
   receiving a command for setting a scheduled viewing of broadcast content;
   recording the scheduled broadcast content;
   during the recording, detecting presence of a user; and
   determining whether to delete the recorded broadcast content based on a result of the detecting the presence of the user,
   wherein the determining comprises displaying first graphic items for deleting the recorded broadcast content if the user is not present more than a predefined amount of time during the recording and the user is present at an end of the recording, and displaying a second graphic item for viewing the recorded broadcast content if the user is not present more than the predefined amount of time during the recording and the user is not present at the end of the recording.

2. The method of claim 1, wherein the detecting comprises detecting the presence of the user at regular intervals of time during the recording to determine whether there is a case where the user has not been present for more than the predefined amount of time.

3. The method of claim 2, wherein the determining whether to delete the recorded broadcast content comprises, if it is determined that there is no case where the user has not been present for more than the predefined amount of time, deleting the recorded broadcast content.

4. The method of claim 2, wherein the determining whether to delete the recorded broadcast content comprises, if it is determined that there is no case where the user has not been present for more than the predefined amount of time:
   displaying a Graphic User Interface (GUI) requesting whether to delete the recorded broadcast content; and
   in response to a receipt of a delete command to delete the recorded broadcast content from the user via the GUI, deleting the recorded broadcast content.

5. The method of claim 2, wherein the determining whether to delete the recorded broadcast content comprises, if the user is determined to have not been present for more than the predefined amount of time, detecting the presence of the user again at an end of broadcasting of the scheduled broadcast content.

6. The method of claim 5, wherein the determining whether to delete the recorded broadcast content further comprises:
   if the user is determined to be present at the end of the broadcasting of the scheduled viewing-set broadcast content, displaying a GUI requesting whether to delete the recorded broadcast content; and
   in response to a receipt of a delete command to delete the recorded broadcast content from the user via the GUI, deleting the recorded broadcast content.

7. The method of claim 5, further comprising:
   if the user is determined to be still not present at the end of the broadcasting of the scheduled viewing-set broadcast content, displaying a GUI indicating that the recording of the broadcast content is complete.

8. The method of claim 5, further comprising:
   if the user is determined to be present at the end of the broadcasting of the scheduled viewing-set broadcast content after not being present for more than the predefined amount of time, displaying a GUI requesting whether to render the recorded broadcast content.

9. The method of claim 1, further comprising:
   during the recording, receiving a record command for the scheduled viewing-set broadcast content; and
   upon receiving the record command, stopping the recording of the broadcast content, deleting the recorded broadcast content, and re-recording the scheduled broadcast content from a point where the recording has stopped.

10. The method of claim 1, further comprising:
    if there are two or more scheduled broadcast contents whose broadcast times overlap with each other, displaying a GUI indicating that a scheduled viewing of at least one of the two or more scheduled broadcast contents is unavailable.

11. The method of claim 1, wherein the recording the scheduled broadcast content comprises, if the scheduled broadcast content cannot be recorded, recording a rerun of the scheduled broadcast content.

12. The method of claim 1, wherein the detecting the presence of the user comprises detecting a body of the user using a sensing unit.

13. A display apparatus for setting a scheduled viewing of broadcast content, the display apparatus comprising:
a display unit;
an input unit which receives a command for setting a scheduled viewing of broadcast content;
a control unit which records the scheduled broadcast content; and
a sensing unit which detects presence of a user during the recording of the scheduled broadcast content,
wherein the control unit determines whether to delete the recorded broadcast content based on a result of the detection performed by the sensing unit,
wherein the control unit displays first graphic items for deleting the recorded broadcast content if the user is not present more than a predefined amount of time during the recording and the user is present at an end of the recording, and displays a second graphic item for viewing the recorded broadcast content if the user is not present more than the predefined amount of time during the recording and the user is not present at the end of the recording.

14. The display apparatus of claim 13, wherein the control unit controls the sensing unit to detect the presence of the user at regular intervals of time during the recording of the scheduled broadcast content to determine whether the user has not been present for more than the predefined amount of time.

15. The display apparatus of claim 14, wherein the control unit deletes the recorded broadcast content if the result of the detection performed by the sensing unit indicates that there is no case where the user has not been present for more than the predefined amount of time.

16. The display apparatus of claim 14, wherein, if the result of the detection performed by the sensing unit indicates that there is no case where the user has not been present for more than the predefined amount of time, the control unit controls the sensing unit to redetect the presence of the user again at an end of broadcasting of the scheduled broadcast content.

17. The display apparatus of claim 16, wherein, if a result of the redetection performed by the sensing unit indicates that the user is present at the end of the broadcasting of the scheduled broadcast content, the control unit displays a GUI requesting whether to delete the recorded broadcast content on the display unit, and in response to a receipt of a command to delete the recorded broadcast content from the user via the GUI, deletes the recorded broadcast content.

18. The display apparatus of claim 16, wherein, if a result of the redetection performed by the sensing unit indicates that the user is still not present at the end of the broadcasting of the scheduled viewing-set broadcast content, the control unit displays a GUI indicating that the recording of the scheduled broadcast content is complete on the display unit.

19. The display apparatus of claim 13, wherein, if a record command for the scheduled broadcast content is received during the recording of the scheduled broadcast content, the control unit stops the recording of the scheduled broadcast content, deletes the recorded broadcast content, and re-records the scheduled broadcast content from a point where the recording has stopped in accordance with the record command.

20. The display apparatus of claim 13, wherein, if there are two or more scheduled broadcast contents whose broadcast times overlap with each other, the control unit displays a GUI indicating that a scheduled viewing of at least one of the two or more scheduled broadcast contents is unavailable on the display unit.

21. The display apparatus of claim 13, wherein, if the scheduled broadcast content cannot be recorded, the control unit records a rerun of the scheduled broadcast content.

22. The display apparatus of claim 13, wherein the sensing unit is one of a motion detector and a thermal detector which detects a presence of a body of the user to determine the presence of the user.

23. The display apparatus of claim 14, wherein, if the result of the detection performed by the sensing unit indicates that there is no case where the user has not been present for more than the predefined amount of time, the control unit displays a Graphic User Interface (GUI) requesting whether to delete the recorded broadcast content on the display unit, and in response to a receipt of a delete command to delete the recorded broadcast content from the user via the GUI, deletes the recorded broadcast content.

24. The display apparatus of claim 16, wherein, if the result of the redetection performed by the sensing unit indicates that the user is present at the end of the broadcasting of the scheduled broadcast content after not being present for more than the predefined amount of time, the control unit displays a GUI requesting whether to render the recorded broadcast content on the display unit.

\* \* \* \* \*